(Model.)
J. W. McARDELL.
GUARD FOR PLUMBERS' SHAVE HOOKS.
No. 257,035. Patented Apr. 25, 1882.
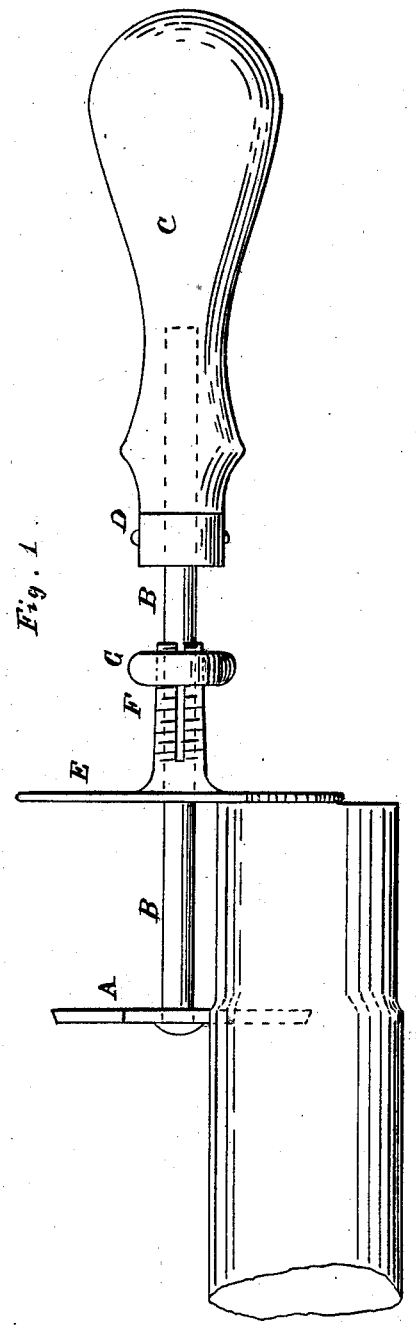
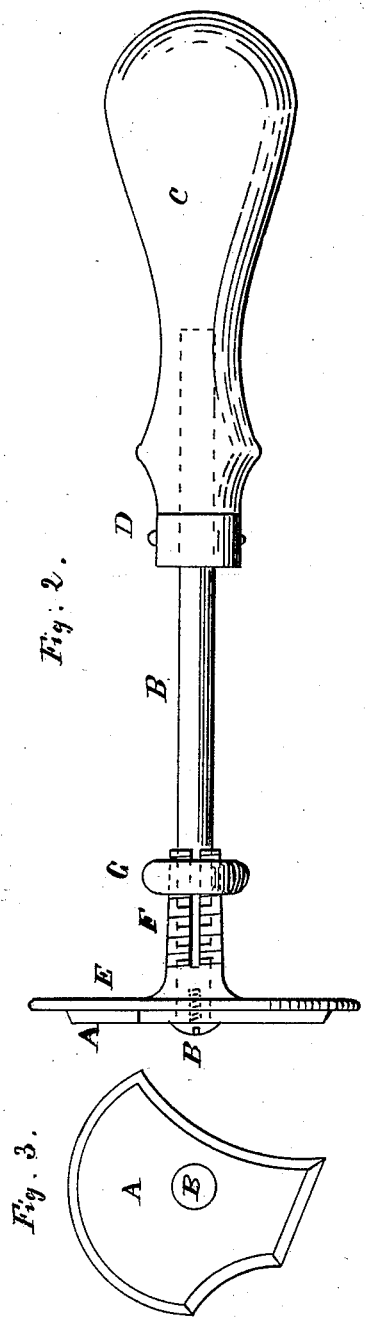
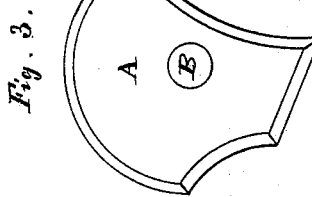
WITNESSES:
INVENTOR:
BY
ATTORNEYS.
N. PETERS. Photo-Lithographer, Washington, D. C.

UNITED STATES PATENT OFFICE.

JOHN W. McARDELL, OF BROOKLYN, NEW YORK.

GUARD FOR PLUMBERS' SHAVE-HOOKS.

SPECIFICATION forming part of Letters Patent No. 257,035, dated April 25, 1882.

Application filed March 21, 1882. (Model.)

*To all whom it may concern:*

Be it known that I, JOHN W. McARDELL, of Brooklyn, in the county of Kings and State of New York, have invented certain new and useful Improvements in Guards for Plumbers' Shave-Hooks, of which the following is a full, clear, and exact description.

Reference is to be had to the accompanying drawings, forming part of this specification, in which similar letters of reference indicate corresponding parts in all the figures.

Figure 1 is a side elevation of my improvement, illustrating one of its uses. Fig. 2 is a side elevation of the same, illustrating another use. Fig. 3 is a plan view of one form of a shave-hook.

The object of this invention is to protect the edges of plumbers' shave-hooks while being carried, and also to promote convenience in using the said shave-hooks.

The invention consists in a guard for plumbers' shave-hooks, constructed with a disk perforated to receive the shank of the hook, and provided with a split tubular stem having an interior screw-thread to receive a hand-nut for clamping the said stem to the shave-hook shank, whereby the said disk can be readily adjusted and will be securely held in place, as will be hereinafter fully described.

A is the knife or hook, which may be made of any desired shape or size, and is attached to a shank or stem, B, in the ordinary manner. The other end of the shank B is inserted in a handle, C, where it is secured in place by a pin, D, inserted in a hole formed through the said handle and shank, so that the handle can be readily detached.

E is a disk having a hole through its center to receive the shank B. The disk E is made of such a size as to project beyond the edge of the shave-hook A, and to its center is attached a tubular stem, F, to receive and fit upon the shank B. The stem F is split, is slightly tapered toward its outer end, and has a screw-thread cut upon its outer surface to receive a hand-nut, G, so that the tubular stem F can be clamped to and loosened from the shank B by turning the hand-nut G on and off. With this construction, by sliding the disk E down against the hook A and tightening the nut G the said hook will be protected, so that a plumber can carry it in his bag with his other tools without any danger that the edge of the shave-hook will come in contact with anything and be dulled. With this construction, also, when the hook is to be used for shaving the end of a lead or other soft-metal pipe the guard E is adjusted at a distance from the shave-hook A equal to the length of the part of the pipe to be shaved, so that the shaving will begin on all sides of the pipe at the same distance from its end, and the shaving can be neatly and quickly done.

Having thus fully described my invention, I claim as new and desire to secure by Letters Patent—

1. A guard for plumbers' shave-hooks, constructed substantially as herein shown and described, and consisting of the perforated disk, the split tubular stem having exterior screw-thread, and the hand-nut, as set forth.

2. The combination, with the hook A and shank B, of the adjustable disk E, substantially as herein shown and described, whereby the said disk will serve as a guard to protect the edge of the shave-hook and as a gage to limit the length of pipe shaved, as set forth.

3. The combination, with the hook A and shank B, of the disk E, provided with the split tubular stem F, having exterior screw-thread, and the hand-nut G, substantially as herein shown and described, whereby the said disk can be readily adjusted, and will be held securely in place, as set forth.

JOHN W. McARDELL.

Witnesses:
JAMES T. GRAHAM,
C. SEDGWICK.